United States Patent
Grübel et al.

(10) Patent No.: US 10,218,238 B2
(45) Date of Patent: Feb. 26, 2019

(54) SELF-ADHESIVE SLOT-CLOSING DEVICE FOR AN ELECTRIC MACHINE

(71) Applicant: Siemens Aktiengesellschaft, München (DE)

(72) Inventors: André Grübel, Fürth (DE); Dieter Schirm, Breitengüssbach (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 15/561,426

(22) PCT Filed: Jan. 29, 2016

(86) PCT No.: PCT/EP2016/051951
§ 371 (c)(1),
(2) Date: Sep. 25, 2017

(87) PCT Pub. No.: WO2016/150595
PCT Pub. Date: Sep. 29, 2016

(65) Prior Publication Data
US 2018/0054105 A1    Feb. 22, 2018

(30) Foreign Application Priority Data

Mar. 26, 2015 (EP) .................................... 15161100

(51) Int. Cl.
*H02K 3/493* (2006.01)
*C09J 11/00* (2006.01)
(Continued)

(52) U.S. Cl.
CPC .............. *H02K 3/493* (2013.01); *C08K 7/28* (2013.01); *C08K 9/10* (2013.01); *C09J 9/00* (2013.01);
(Continued)

(58) Field of Classification Search
CPC .... H02K 3/493; H02K 3/487; H02K 15/0018; H02K 15/0031; H02K 15/12;
(Continued)

(56) References Cited

U.S. PATENT DOCUMENTS

| 3,615,972 A | 10/1971 | Morehouse, Jr. et al. |
| 4,303,736 A | 12/1981 | Torobin |
| 5,365,135 A * | 11/1994 | Konrad ............... H02K 3/48 |
| | | 310/214 |
| 2001/0016629 A1* | 8/2001 | Mori ..................... C08K 3/04 |
| | | 525/332.8 |

(Continued)

FOREIGN PATENT DOCUMENTS

| CN | 201422043 Y | 3/2010 |
| CN | 202309299 U | 7/2012 |

(Continued)

OTHER PUBLICATIONS

Machine translation of JP 55029242 A (Mar. 1980).*

*Primary Examiner* — Michael Andrews
(74) *Attorney, Agent, or Firm* — Henry M. Feiereisen LLC

(57) ABSTRACT

A slot-closing device for closing a slot in a stator or a rotor of an electric machine includes a closure element which contains a ferromagnetic material. An adhesive layer disposed on the closure element is designed to expand and harden when heated. The adhesive layer contains a thermally activatable blowing agent configured as an expansion element which contains a closed cavity filled with gas. The cavity is partially enclosed by a thermoplastic resin in the expansion element.

30 Claims, 2 Drawing Sheets

(51) Int. Cl.
*H02K 15/00* (2006.01)
*C09J 9/00* (2006.01)
*C08K 9/10* (2006.01)
*C08K 7/28* (2006.01)
*C08K 7/22* (2006.01)

(52) U.S. Cl.
CPC ........... *C09J 11/00* (2013.01); *H02K 15/0018* (2013.01); *C08K 7/22* (2013.01); *C09J 2205/30* (2013.01)

(58) Field of Classification Search
CPC ..... H02K 15/125; C09J 11/00; C09J 2205/30; C08K 7/22; C08K 9/10
USPC .................................................. 310/214, 215
See application file for complete search history.

(56) References Cited

U.S. PATENT DOCUMENTS

2006/0258793 A1* 11/2006 Nonaka ................... C08L 23/16
 524/495
2013/0272904 A1* 10/2013 Hozumi ................. H02K 5/128
 417/360
2016/0156241 A1 6/2016 Grübel et al.

FOREIGN PATENT DOCUMENTS

| | | |
|---|---|---|
| CN | 102780297 A | 11/2012 |
| CN | 202759310 U | 2/2013 |
| DE | 15 38 935 A1 | 5/1970 |
| EP | 2 706 649 A1 | 3/2014 |
| JP | 55029242 A * | 3/1980 ............. H02K 3/493 |
| JP | S56161486 A | 12/1981 |
| JP | H05211739 A | 8/1993 |
| SU | 1737629 A1 | 5/1992 |

* cited by examiner

SELF-ADHESIVE SLOT-CLOSING DEVICE FOR AN ELECTRIC MACHINE

CROSS-REFERENCES TO RELATED APPLICATIONS

This application is the U.S. National Stage of International Application No. PCT/EP2016/051951, filed Jan. 29, 2016, which designated the United States and has been published as International Publication No. WO 2016/150595 A1 and which claims the priority of European Patent Application, Serial No. 15161100.1, filed Mar. 26, 2015, pursuant to 35 U.S.C. 119(a)-(d).

BACKGROUND OF THE INVENTION

The invention relates to a slot-closing device for closing a slot in a stator or rotor of an electric machine. The slot-closing device enables electrical conductive elements, for example copper bars, by means of which a three-phase winding is formed, to be fixed or retained in position in the slot. Also included in the invention are a device which can be embodied as a stator or rotor and a method for closing a slot of the stator or rotor.

The slots of electric machines serve to accommodate the insulated electrical conductive elements or, as the case may be, an arrangement of such conductive elements. The slots generally have a slot opening which is directed toward the air gap of the electric machine. The conductive elements can be inserted into the slot by way of the slot opening during the manufacture of the electric machine. In particular in the case of high-voltage machines, the practice is to make use of what are termed open slots, in which the slot opening extends over the entire slot width.

Once the conductive elements have been inserted, the slot opening must be closed in order to prevent the conductive elements from working their way out of the slot during the operation of the electric machine. The slot closure is usually achieved by means of solid slot closure elements, known as slot wedges. Said slot wedges may be fabricated for example from technical laminated materials by mechanical processing. Equally, they may be fabricated from thermoplastic or duroplastic molding materials by means of strand extrusion or injection molding.

The slot closure materials can be non-magnetizable composites, which therefore make no effective contribution to the magnetizability of the stator, as a result of which the power factor, efficiency and heat buildup, and consequently resistive losses, can exhibit unfavorable values.

In order to improve the magnetic flux guidance in the region of the slot opening, slot closures can be embodied in part using soft-magnetic materials, for example by means of iron-filled ferritic laminated materials. Such a slot-closing device is known from EP 2 706 649 A1, for example.

A major disadvantage with soft-magnetic slot-closing devices is that on account of the hard material used it is not possible to guarantee the permanent tightness of fit in the slot, because the soft-magnetic material executes a proper motion due to the magnetic alternating loads during the operation of the machine in combination with thermal load, thermomechanical alternating load and environmental influences, as a result of which proper motion the slot-closing device can shake itself loose.

In this regard it is known from DE 15 38 935 A to insert a slot wedge together with a plastic part into the slot, the plastic part being designed to increase its volume upon being heated and to maintain the increased volume even upon subsequently cooling down. A disadvantageous aspect with this arrangement is that in order to close a slot, a precise arrangement of the plastic part between a slot wall and the slot wedge is necessary initially before the fixing is possible by heating the plastic part. This makes the operating step of arranging the slot wedge in the slot very complicated and time-consuming.

JP S56 161486 A discloses a method for laminating wooden layers by means of an adhesive agent and bonding the laminated wooden layers together. The wooden layers are joined together by introducing heat in a press. The adhesive agent cures in the process. The adhesive agent itself contains microspheres.

SUMMARY OF THE INVENTION

The object underlying the invention is to close a slot of an electric machine in the minimum possible time.

The object is achieved by means of the subject matter of the respective independent claims. Advantageous developments of the invention are revealed by the features of the dependent claims.

The invention comprises a slot-closing device for closing a slot of a stator or rotor of an electric machine. A rotor of a linear motor or a rotor of a rotary machine may be provided as the rotor, for example. The slot-closing device comprises a closure element that contains a ferromagnetic material, e.g. iron.

In the slot-closing device according to the invention, said closure element is preconfigured in such a way that it can be arranged in a slot and fixed in position with little effort. An adhesive layer is disposed on the closure element for this purpose. The adhesive layer contains a thermally activatable blowing agent. In other words, elements of the blowing agent expand as soon as a predetermined expansion temperature is reached or exceeded. The adhesive layer is furthermore embodied to be thermally hardened. In other words, the warming or heating of the adhesive layer induces three processes. Firstly, the adhesive is resoftened or liquefied and at the same time the blowing agent expands, this being followed by the crosslinking or polymerization of the adhesive, as a result of which the adhesive layer maintains its expanded volume even after subsequently cooling down. The adhesive layer swells due the effect of being heated and hardens. The adhesive agent for the adhesive layer can be based on a duroplast, for example, in particular an epoxy or an epoxy derivative. The closure element may be embodied for example with a trapezoidal cross-section in a per se known manner, i.e. it may form the actual slot wedge for closing a slot. A plurality of adhesive layers of the type described may also be disposed on the closure element.

According to the invention, the adhesive layer contains at least one expansion element as the blowing agent. The expansion element has at least one closed cavity filled with a gas. A hollow sphere or a closed-cell foam, for example, may be provided as the expansion element. This yields the advantage that a mechanical expansion is induced rather than a chemical expansion. A chemical expansion may under certain conditions require a higher expansion temperature.

According to the invention, the cavity in each expansion element is at least partially enclosed by a thermoplastic resin. This yields the advantage that the expansion temperature is adjustable based on the choice of the resin. A further advantage is that the expansion element becomes softer as the resin is heated and as a result the expansion is simplified or facilitated.

Also part of the invention are developments by means of which additional advantages are produced.

According to a development, the adhesive layer contains an adhesive agent based on a reaction resin in the B stage. In other words, the adhesive agent is in a partially cured state. This yields the advantage that the adhesive agent of the adhesive layer is self-adhering, i.e. does not flow down or off from the closure element.

According to a development, the resoftening temperature of the B stage is set to a value in a range from 50° C. to 250° C., preferably from 50° C. to 150° C., in particular from 70° C. to 120° C. A resoftening temperature above 50° C., for example 70° C., has the advantage that an unintentional softening of the adhesive agent, for example during a transportation of the slot-closing device to a factory for electric machines, is avoided. The setting of the resoftening temperature can be achieved by appropriate choice of a reaction resin.

According to a development, a pressure of the gas in the respective cavity is greater than 1.1 bar, in particular greater than 1.5 bar. In other words, the pressure of the gas is greater than the atmospheric pressure. This yields the advantage that following the expansion the expansion element does not shrink as it cools down.

According to a development, an expansion temperature of the at least one expansion element is set in a range from 50° C. to 250° C., preferably in a range from 50° C. to 150° C., in particular in a range from 70° C. to 120° C. This yields the advantage that in order to trigger the expansion a temperature is necessary which is lower than for a chemical expansion. If a chemical blowing agent is available which has a lower expansion temperature than the liquefaction temperature of the adhesive layers used, then it is also possible to use a chemical blowing agent, e.g. a granulate, which transitions into a gaseous state at the expansion temperature.

According to a development, a plurality of expansion elements are provided, an average diameter d50 of the expansion elements lying in a range from 1 micrometer to 50 micrometers. The average diameter is in particular the statistical mean of a normally distributed diameter distribution. The expansion elements are designed to have an average diameter in a range from 20 micrometers to 200 micrometers, preferably from 50 micrometers to 200 micrometers in the expanded state. This ensures a tight fit of the closure element in a slot.

According to a development, the closure element, for example the slot wedge, has ferromagnetic sheet-metal lamination layers that are electrically insulated from one another. A respective extension plane of each sheet-metal lamination layer is oriented perpendicularly to a longitudinal extension direction of the closure element. In other words, after being arranged in a stator lamination stack or rotor lamination stack, the sheet-metal lamination layers of the closure element are aligned so as to be coplanar with or parallel to the sheet-metal laminations of the lamination stack of the stator or rotor. This yields the advantage that no eddy currents can be induced even in the closure element during the operation of the electric machine.

The slot-closing device can be provided independently of a rotor or stator, i.e. it is embodied as a supplier part for the manufacture of a stator or rotor. After a slot-closing device according to the invention has been installed in a stator or rotor, a device also included in the invention is produced, which device is embodied as a stator or rotor for an electric machine, wherein electrical conductive elements of a three-phase winding are disposed in at least one slot of the device and the slot is closed by means of a slot wedge according to an embodiment variant of the invention. As a rotor, the device can be embodied in the described manner as a rotor or as an armature of a linear motor.

Also included in the invention is a method for closing a slot of a stator or rotor of an electric machine. An embodiment variant of the slot-closing device according to the invention is provided and the same is disposed in the slot. The adhesive layer of the slot-closing device is then heated, at least to a temperature at which the at least one expansion element of the adhesive layer expands, i.e. at least up to the expansion temperature. The adhesive (e.g. starting from a B stage) softens again and in the process passes through a temperature- and time-dependent viscosity minimum. At the same time the adhesive layer swells and subsequently hardens into a non-resoftenable form. As a result, the adhesive layer maintains its expanded volume even after subsequently cooling down.

According to a development, a dimension of the slot-closing device is chosen such that a cross-section of the slot-closing device including the adhesive layer is smaller than a corresponding slot cross-section of the slot. This prevents the adhesive layer from being stripped off against a slot wall of the slot when the slot-closing device is inserted into the slot along an axial direction of the rotor or stator.

According to a development, the closure element disposed in the slot is arranged contactlessly in the slot in relation to slot walls of the slot. This yields the advantage that the slot walls are electrically insulated with respect to the closure element. This prevents the formation of a current path between the lamination stack of the stator or rotor on the one hand and the closure element on the other hand. As a result there can be no induction of an eddy current that flows between the closure element on the one hand and the lamination stack on the other hand.

According to a development, after being arranged in the slot the slot-closing device is fixed in position in the slot at at least one slot end of the slot, in particular at both slot ends of the slot, by means of a non-ferromagnetic retaining element. This yields the advantage that the relative location of the closure element with respect to the slot walls is maintained even when the application of heat to the adhesive layer causes the adhesive agent in the adhesive layer to be liquefied and as a result to lose its supporting property temporarily.

The heating of the adhesive layer can be effected by thermal treatment in a convection oven and/or by inductive heating of the closure element of the slot-closing device and/or of the stator/rotor. Applying heat to the closure element and/or to the lamination stack of the stator/rotor yields the advantage that the heat is uniformly distributed and as a result the adhesive layer can be fully transitioned into the hardened state.

The closure element can be manufactured from pieces of sheet metal that were produced during the die stamping of slot cross-sections in metal sheets for a lamination stack of the electric machine. This yields the advantage that the scrapping or wastage of sheet metal during the manufacture of the electric machine is reduced.

Also included in the invention are developments of the inventive method which have features that have already been described in connection with developments of the inventive slot-closing device. For this reason corresponding developments of the inventive method are not described again here.

BRIEF DESCRIPTION OF THE DRAWING

An exemplary embodiment of the invention is described below. In the figures.

DETAILED DESCRIPTION OF PREFERRED EMBODIMENTS

The exemplary embodiment explained hereinbelow is a preferred embodiment variant of the invention. In the exemplary embodiment, the described components of the embodiment variant in each case represent individual features of the invention which are to be considered independently of one another and which in each case also develop the invention independently of one another and consequently are also to be regarded as part of the invention either individually or in a different combination from that shown. Furthermore, the described embodiment variant can also be supplemented by further of the already described features of the invention.

In the figures, functionally identical elements are in each case labeled with the same reference signs.

Figure 1:
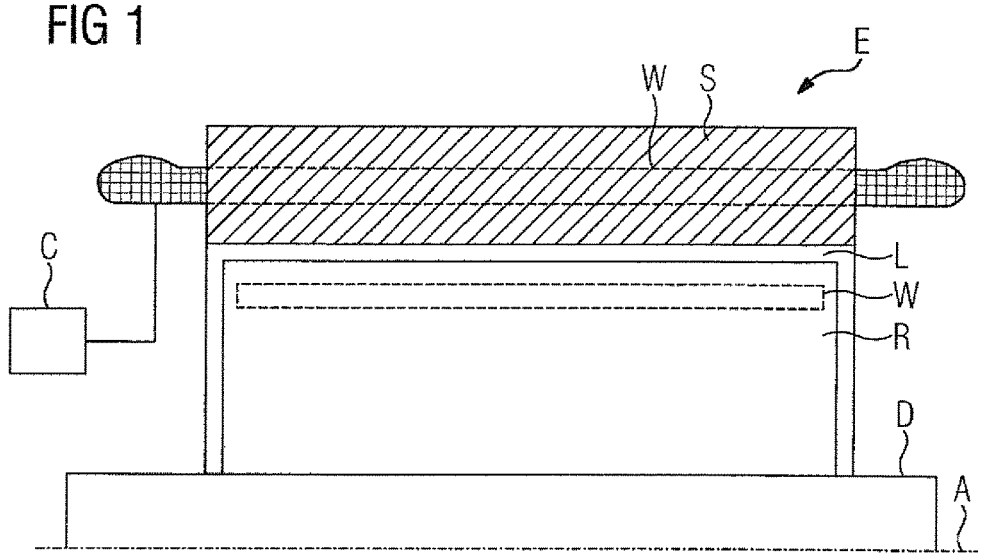
FIG. 1 shows a schematic view of an electric machine comprising an embodiment variant of the device according to the invention.

FIG. 1 shows a longitudinal section through an electric machine E, which may be a synchronous machine or an asynchronous machine, for example. In FIG. 1, an axis of rotation A also represents an axis of symmetry of the illustration. The electric machine E comprises a stator S in which windings W of electrical coils are disposed, only one of the windings W being shown in FIG. 1. The windings W can be formed from conductive elements, e.g. wires or bars. The windings W are energized alternately by means of a three-phase current source C, as a result of which a rotating magnetic field is generated in the interior of the stator S in an air gap L of the electric machine E. The three-phase current source C can be an inverter, for example, or a fixed-frequency electricity supply network.

Located in the interior of the stator S is a rotor R, which is connected to a shaft D for co-rotation therewith. The shaft D is mounted in the stator S so as to be rotatable about the axis of rotation A. Windings W composed of conductive elements may likewise be disposed in the rotor R.

The rotor R and/or the stator S can in each case be an embodiment variant of the device according to the invention.

Figure 2:
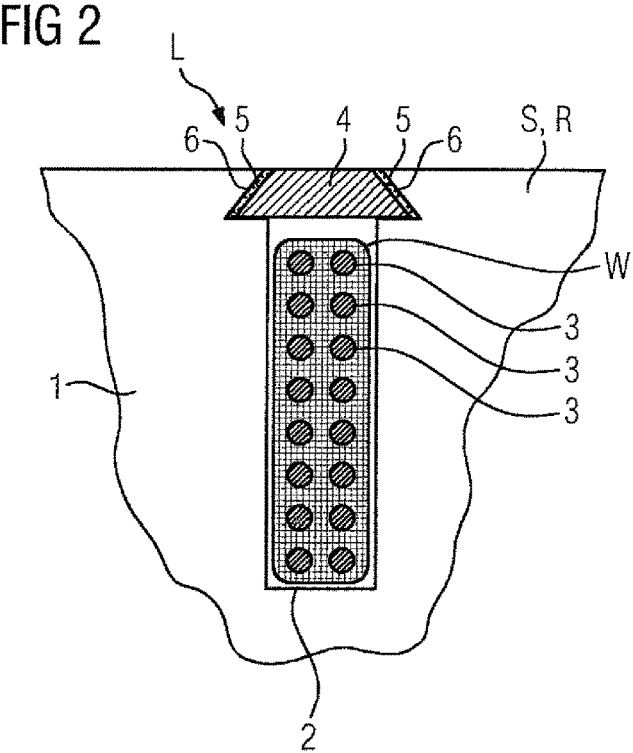
FIG. 2 shows a schematic view of a slot that may be found in a stator or rotor of the electric machine from FIG. 1.

FIG. 2 shows a detail of a cross-section, which can be a cross-section of the stator S or of the rotor R. Slots 2 can be provided in a lamination stack 1 of the stator or rotor, only one of which slots is shown in FIG. 2 for clarity of illustration reasons. A longitudinal extension direction of the slot 2 is aligned parallel to the axis of rotation A. It is oriented perpendicularly to the drawing plane of FIG. 2.

One of the windings W can be disposed in the slot 2, i.e. conductive elements 3 of the winding W extend in the slot 2 in the axial direction. For clarity of illustration reasons, only some of the conductive elements 3 are labeled with a reference numeral in FIG. 2. The slot 2 is closed off toward the air gap L by means of a closure element 4 which is retained in an undercut 6 of the slot 5 by means of a hardened adhesive layer 5. The adhesive layer 5 is sufficiently thick to secure the closure element 4 in the undercut 6 in a play-free manner. It was nonetheless possible to insert the closure element 4 into the slot 2 together with the not yet hardened adhesive layer 5 in a single operating step, the closure element 4 having been inserted into the slot together with the adhesive layer 5 in the axial direction from an axial end of the lamination stack 1 along a longitudinal extension direction of the undercut 6.

Figure 3:
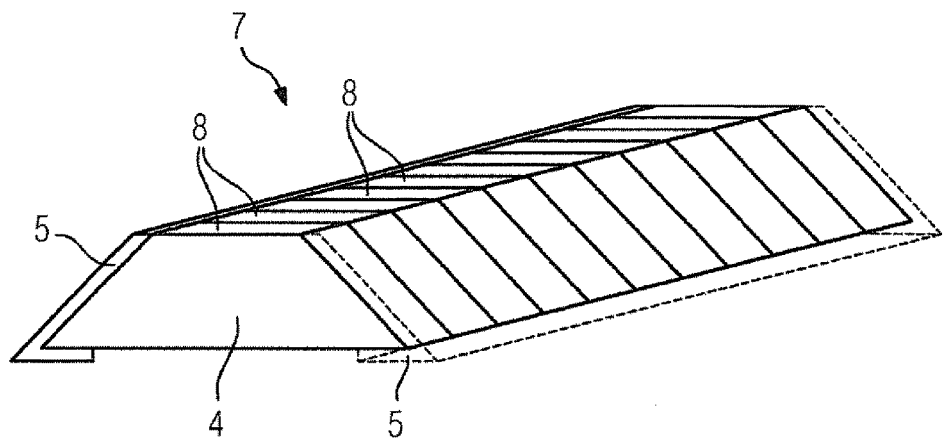
FIG. 3 shows a schematic view of a slot closure device by means of which the slot from FIG. 2 can be closed.

For this purpose, the closure element 4 was provided together with the adhesive layer 5 as a slot-closing device 7, as illustrated in FIG. 3. The closure element 4 can be produced by stacking ferromagnetic sheet-metal lamination layers 8 together or on top of one another, which layers are electrically insulated from one another, and applying heat thereto. For clarity of illustration reasons, only some of the sheet-metal lamination layers 8 are labeled with a reference numeral in FIG. 3. The insulation and adhesive bonding of the sheet-metal lamination layers can be accomplished by means of a coating known as bonding varnish. This is known per se from the manufacture of lamination stacks such as the lamination stack 1. The adhesive layer 5 is disposed on the closure element 4, an adhesive agent of the adhesive layer 5 being in a B stage, that is to say in a partially polymerized state. As a result the adhesive layer 5 continues to adhere to the closure element 4 and for example does not drip off from the closure element 4.

The slot-closing device 7 can be inserted into the undercut 6 in the axial direction in the described manner. The adhesive layer can then be heated.

Figure 4:
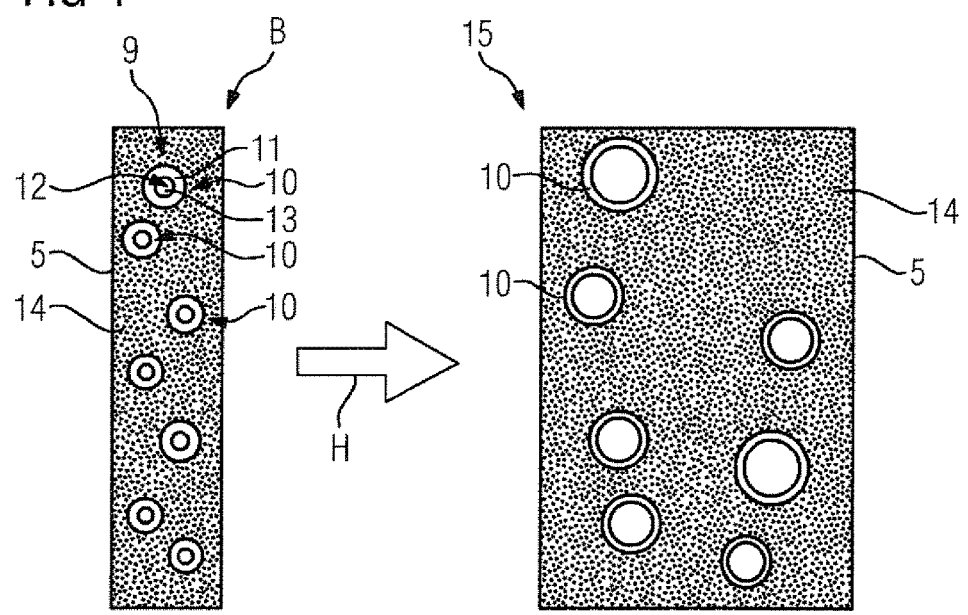
FIG. 4 shows a schematic view of an adhesive layer which can be provided by the slot-closing device from FIG. 3.

FIG. 4 illustrates how a blowing agent 9 comprising individual expansion elements 10 can be provided in the adhesive layer 5. For clarity of illustration reasons, only some of the expansion elements 10 are labeled with a reference numeral in FIG. 4. Each expansion element 10 can be embodied for example as a microsphere, i.e. a hollow sphere 11, which can be provided or manufactured from a thermoplastic resin, for example. A gas 13 can be disposed in a cavity 12 in the hollow sphere 11. The gas 13 can have a pressure which is greater than 1.1 bar, in particular greater than 1.5 bar.

The introduction of heat H causes an adhesive agent 14 of the adhesive layer 5 to become softened or liquefied. Furthermore, the expansion elements 10 expand. This causes the adhesive layer 5 to swell and subsequently harden, as a result of which the adhesive maintains its expanded volume even after subsequently cooling down. A hardened state 15 is produced. As a result of the swelling, the closure element 4 becomes lodged or wedged between opposite walls of the undercut 6 on the one hand and adhesively bonded on the other hand.

A size of a cross-section of the slot closure element 7 is matched to the lamination stack, in particular to a slot width of the slot 2 in the region of the undercut 6. The undercut 6 forms a track for the closure element. When the slot closure element 7 is inserted, adhesive agent can be stripped off during the insertion due to the lamination stack misalignment of individual electric sheets of the lamination stack 1, as a result of which the necessary adhesive bonding of the closure element over its surface would not be guaranteed. A dimension of the slot closure element is therefore chosen to be sufficiently small that the slot closure element 7 including its adhesive layer 5 is narrower or has a smaller dimension than the slot 2 in the region of the undercut 6. This allows the slot-closing device 7 to be inserted into the slot 2 without adhesive agent being stripped off. Since the adhesive layer 5 remains in the expanded state 15 after cooling down, the closure element 4 is nonetheless tightly seated in the slot.

After the slot-closing device 7 is inserted into the slot, the slot-closing device 7 can be fixed in position at the axial lamination stack ends by means of non-magnetic slot closure wedges in order to secure it temporarily until the expansion of the adhesive layer and polymerization of the adhesive agent 14. The thermally excited expansion and the polymerization can be effected or achieved through heat treatment in the convection oven or by inductive heating of the slot-closing device 7.

A simple application process for solid magnetic slot closure wedges, i.e. closure elements, in an electric machine is produced by providing a closure element 4 preconfigured with an adhesive layer 5, that is to say by providing the slot-closing device 7. The complete attachment of the slot wedge across both the axial and the radial lamination stack dimension is ensured. It is even possible to achieve an improvement in the tightness of fit. At the same time the number of process steps is minimized, because no additional gluing application is necessary.

The layered arrangement of the closure element 4 results in an increase in magnetic utilization at the same time as increased thermal and mechanical robustness through use of the layered bonding-varnish-coated sheet-metal laminations. Because use is made of those sheet-metal parts which are produced when a profile of the slot 2 is stamped out in the individual sheet-metal laminations of the lamination stack 1 in order to provide the sheet-metal lamination layers 8, a virtually complete utilization of the lamination stack blanks can be realized.

All in all, the example shows how a glued-in magnetic slot closure for an electric machine can be provided by means of the invention.

What is claimed is:

1. A slot-closing device for closing a slot in a stator or a rotor of an electric machine, comprising:
    a closure element for closing the slot, said closure element containing a ferromagnetic material; and
    an adhesive layer disposed on the closure element and designed to expand and harden when heated, said adhesive layer containing a thermally activatable blowing agent configured as an expansion element which contains a closed cavity filled with gas and is partially enclosed by a thermoplastic resin,
    wherein a pressure of the gas in the cavity prior to an expansion is greater than 1.1 bar so that the thermoplastic resin expands when heat is applied to the thermoplastic resin.

2. The slot-closing device of claim 1, wherein the adhesive layer contains an adhesive agent based on a reaction resin in a B stage.

3. The slot-closing device of claim 2, wherein a resoftening temperature of the B stage has a value in a range from 50° C. to 250° C.

4. The slot-closing device of claim 2, wherein a resoftening temperature of the B stage has a value in a range from 50° C. to 150° C.

5. The slot-closing device of claim 2, wherein a resoftening temperature of the B stage has a value in a range from 70° C. to 120° C.

6. The slot-closing device of claim 1, wherein the pressure of the gas in the cavity prior to an expansion is greater than 1.5 bar.

7. The slot-closing device of claim 1, wherein an expansion temperature of the expansion element lies in a range from 50° C. to 250° C.

8. The slot-closing device of claim 1, wherein the adhesive layer has a plurality of expansion elements with an average diameter d50 in an expanded state in a range from 1 micrometer to 50 micrometers.

9. The slot-closing device of claim 1, wherein the closure element has ferromagnetic sheet-metal lamination layers that are electrically insulated from one another, each of the lamination layers defining an extension plane which is oriented perpendicularly to a longitudinal extension direction of the closure element.

10. A method for closing a slot in a stator or a rotor of an electric machine, comprising:
    disposing in the slot a slot-closing device as set forth in claim 1;
    heating the adhesive layer of the slot-closing device at least until an expansion element of the adhesive layer of the slot-closing device expands, thereby causing the adhesive layer to swell;
    curing the adhesive layer; and
    cooling down the adhesive layer.

11. The method of claim 10, further comprising selecting a dimension of the slot-closing device such that a cross-section of the slot-closing device including the adhesive layer is smaller than a cross-section of the slot.

12. The method of claim 10, further comprising arranging the closure element in a contactless manner in the slot relative to slot walls of the slot.

13. The method of claim 10, further comprising, after disposing the slot-closing device in the slot, fixing the slot-closing device in position in the slot in at least one slot end of the slot by a non-ferromagnetic retaining element.

14. The slot-closing device of claim 1, wherein an expansion temperature of the expansion element lies in a range from 50° C. to 150° C.

15. The slot-closing device of claim 1, wherein an expansion temperature of the expansion element lies in a range from 70° C. to 120° C.

16. The slot-closing device of claim 1, wherein the adhesive layer has a plurality of expansion elements with an average diameter d50 in an expanded state in a range from 20 micrometers to 200 micrometers.

17. The slot-closing device of claim 1, wherein the adhesive layer has a plurality of expansion elements with an average diameter d50 in an expanded state in a range from 50 micrometers to 200 micrometers.

18. A device embodied as a stator or a rotor for an electric machine, comprising:
    a three-phase winding formed by electrical conductive elements for arrangement in a slot of the device; and
    a closure element for closing the slot, said closure element containing a ferromagnetic material, and an adhesive layer disposed on the closure element in a state in which the adhesive layer has expanded and hardened, said adhesive layer containing a thermally activatable blowing agent configured as an expansion element which contains a closed cavity filled with gas and is partially enclosed by a thermoplastic resin, wherein a pressure of the gas in the cavity prior to an expansion is greater than 1.1 bar so that the thermoplastic resin expands when heat is applied to the thermoplastic resin.

19. The device of claim 18, wherein the adhesive layer contains an adhesive agent based on a reaction resin in a B stage.

20. The device of claim 19, wherein a resoftening temperature of the B stage has a value in a range from 50° C. to 250° C.

21. The device of claim 19, wherein a resoftening temperature of the B stage has a value in a range from 50° C. to 150° C.

22. The device of claim 19, wherein a resoftening temperature of the B stage has a value in a range from 70° C. to 120° C.

23. The device of claim 18, wherein the pressure of the gas in the cavity prior to an expansion is greater than 1.5 bar.

24. The device of claim 18, wherein an expansion temperature of the expansion element lies in a range from 50° C. to 250° C.

25. The device of claim 18, wherein the adhesive layer has a plurality of expansion elements with an average diameter d50 in an expanded state in a range from 1 micrometer to 50 micrometers.

26. The device of claim 18, wherein the closure element has ferromagnetic sheet-metal lamination layers that are electrically insulated from one another, each of the lamination layers defining an extension plane which is oriented perpendicularly to a longitudinal extension direction of the closure element.

27. The device of claim 18, wherein an expansion temperature of the expansion element lies in a range from 50° C. to 150° C.

28. The device of claim 18, wherein an expansion temperature of the expansion element lies in a range from 70° C. to 120° C.

29. The device of claim 18, wherein the adhesive layer has a plurality of expansion elements with an average diameter d50 in an expanded state in a range from 20 micrometers to 200 micrometers.

30. The device of claim 18, wherein the adhesive layer has a plurality of expansion elements with an average diameter d50 in an expanded state in a range from 50 micrometers to 200 micrometers.

* * * * *